United States Patent
Grieser-Schmitz et al.

(10) Patent No.: US 11,806,965 B2
(45) Date of Patent: Nov. 7, 2023

(54) COMPOSITE ELEMENT HAVING IMPROVED PROPERTIES

(71) Applicant: BASF SE, Ludwigshafen am Rhein (DE)

(72) Inventors: Christof Grieser-Schmitz, Lemfoerde (DE); Andre Kamm, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 390 days.

(21) Appl. No.: 16/963,934

(22) PCT Filed: Jan. 25, 2019

(86) PCT No.: PCT/EP2019/051871
§ 371 (c)(1),
(2) Date: Jul. 22, 2020

(87) PCT Pub. No.: WO2019/149634
PCT Pub. Date: Aug. 8, 2019

(65) Prior Publication Data
US 2021/0107255 A1 Apr. 15, 2021

(30) Foreign Application Priority Data
Jan. 31, 2018 (EP) ...................... 8154345

(51) Int. Cl.
| B32B 15/095 | (2006.01) |
|---|---|
| B32B 15/18 | (2006.01) |
| B32B 15/20 | (2006.01) |
| B32B 27/40 | (2006.01) |
| C08G 18/48 | (2006.01) |
| C08G 18/76 | (2006.01) |

(52) U.S. Cl.
CPC ............ B32B 15/095 (2013.01); B32B 15/18 (2013.01); B32B 15/20 (2013.01); B32B 27/40 (2013.01); C08G 18/4808 (2013.01); C08G 18/7671 (2013.01); B32B 2250/03 (2013.01); B32B 2250/40 (2013.01); B32B 2307/536 (2013.01); B32B 2307/54 (2013.01); B32B 2375/00 (2013.01); B32B 2605/12 (2013.01); B32B 2605/18 (2013.01)

(58) Field of Classification Search
CPC ....... Y10T 428/24942; Y10T 428/2495; Y10T 428/24959; Y10T 428/24967; Y10T 428/26; Y10T 428/266; Y10T 428/269; Y10T 428/28; Y10T 428/2804; Y10T 428/2848; Y10T 428/2852; Y10T 428/2896; Y10T 428/31551; Y10T 428/31605; Y10T 428/31678; B32B 7/00; B32B 7/02; B32B 7/04; B32B 7/12; B32B 15/00; B32B 15/04; B32B 15/043; B32B 15/08; B32B 15/095; B32B 15/18; B32B 15/20; B32B 27/00; B32B 27/04; B32B 27/06; B32B 27/40; B32B 2250/03; B32B 2375/00; C09J 7/00; C09J 7/20; C09J 7/28; C09J 7/30; C09J 175/00; C09J 175/04; C09J 175/08; C09J 2400/16; C09J 2400/163; C08G 71/00; C08G 71/04; C08G 2170/00; C08L 75/00; C08L 75/04; C08L 75/08
USPC ....... 428/212–215, 220, 332, 337, 339, 343, 428/344, 354, 355 R, 355 N, 423.1, 425.8, 428/457; 528/44, 59, 60, 65, 66, 67, 76, 528/77, 85
See application file for complete search history.

(56) References Cited

U.S. PATENT DOCUMENTS

| 5,778,813 A | * | 7/1998 | Kennedy ................... B63B 5/00 114/69 |
|---|---|---|---|
| 6,770,374 B1 | | 8/2004 | Wild et al. |
| 6,790,537 B1 | | 9/2004 | Bartz et al. |
| 7,223,457 B1 | | 5/2007 | Mertes et al. |
| 2008/0300377 A1 | | 12/2008 | Nefzger et al. |

FOREIGN PATENT DOCUMENTS

| DE | 19914420 A1 | 10/2000 |
|---|---|---|
| DE | 102007031546 A1 | 12/2008 |
| EP | 0938410 A1 | 9/1999 |
| EP | 1089875 A1 | 4/2001 |
| EP | 1093410 A1 | 4/2001 |
| EP | 1094938 B1 | 7/2002 |
| EP | 1240010 A1 | 9/2002 |
| EP | 1315761 A1 | 6/2003 |
| EP | 1755886 A1 | 2/2007 |
| WO | 2009071470 A1 | 6/2009 |
| WO | WO-2016196258 A1 * | 12/2016 ............ C08G 18/10 |

OTHER PUBLICATIONS

International Search Report of corresponding PCT/EP2019/051871 dated Mar. 14, 2019, 2 pages.

* cited by examiner

Primary Examiner — Maria V Ewald
Assistant Examiner — Ethan A. Utt
(74) Attorney, Agent, or Firm — Armstrong Teasdale LLP

(57) ABSTRACT

The disclosure provides a composite element having a layer structure with 2 mm to 20 mm of metal, 10 mm to 100 mm of compact polyurethane formulation and another 2 mm to 20 mm of metal, a method of using thereof and corresponding production process therefor. The polyurethane formulation is obtainable by reacting (a) a compound having at least two isocyanate groups with (b) polyether polyol and the polyether polyol (b) is a mixture including at least the constituents of polyether polyol (b1) and polyether polyol (b2).

19 Claims, No Drawings

COMPOSITE ELEMENT HAVING IMPROVED PROPERTIES

CROSS-REFERENCE TO RELATED APPLICATIONS

This application is a U.S. National Phase Application of PCT/EP2019/051871, filed on Jan. 25, 2019, which claims the benefit of priority to European Patent Application Number 18154345.5, filed Jan. 31, 2018, the entire contents of which are hereby incorporated by reference herein.

The present invention provides a composite element which is used in load-bearing constructions, based on two metal layers joined by polyurethane, and for the production and use thereof.

For the construction of ships, for example ships' hulls and load bay covers, bridges or high-rise buildings, it is necessary to use construction parts that can withstand considerable stresses by external forces.

Composite elements of this kind are described, for example, in property rights EP 0 938 410, EP 1 089 875, EP 1 094 938, EP 1 093 410, U.S. Pat. No. 6,790,537, EP 1 240 010 and EP 1 315 761.

A problem encountered in the production of composite elements is that of achieving good, uniform and bubble-free filling of the air spaces between the two steel plates. Moreover, the surfaces of the plates have to be well wetted and sufficiently good adhesion between the plates and the polyurethane layer has to be established. Many polyurethanes have different expansion characteristics than the plates used, and so there can be detachment of the polyurethane from the plates in the event of variations in temperature. Moreover, the reaction products used for the production of the polyurethane have to be selected such that they do not contract so significantly in the course of curing as to result in detachment from the plates. At the same time, the construction parts of the invention must withstand high mechanical and dynamic stresses.

These problems can surprisingly be solved by a composite element according to main claim 1. The present invention therefore provides a composite element having the following layer structure:
(i) 2 mm to 20 mm of metal,
(ii) 10 mm to 100 mm of compact polyurethane formulation, the polyurethane being obtainable by reacting
   (a) a compound having at least two isocyanate groups with
   (b) polyether polyol,
   optionally in the presence of
   (c) catalyst and/or
   (d) auxiliaries and/or additives,
   (e) chain extenders
(iii) 2 mm to 20 mm of metal,
wherein the polyether polyol (b) is a mixture comprising at least the constituents of polyether polyol (b1) and polyether polyol (b2). Polyether polyol (b1) and polyether polyol (b2) are preferably not identical.

The metal is preferably selected from the group of aluminum, iron, copper, brass and steel. The metal is preferably steel. The steel is standard steel, hardened steel, chromium-vanadium steel, weathering-resistant steel or an upgraded stainless steel. Vanadium steel is preferably used for lightweight construction bridges. Stainless steel is used wherever corrosion is significant. Copper and brass and alloys thereof, e.g. bronze, preferably find use in the configuration of buildings. Hardened aluminum is used for weight-saving armor-plated vehicles and corresponding switchboxes, especially for the military sector.

Alternatively, it is also possible to use other layer materials, for example sheets of wood, wood fiber composite or plastic.

The choice of suitable materials depends on the requirements, such as strength, stiffness, corrosion resistance, resistance to chemicals, fatigue resistance, extensibility, fracture resistance, behavior at high or low temperature, and also esthetic appearance, intended coating, impact resistance and weldability.

The polyurethane described hereinafter is suitable for bonding to all materials, but the positive properties come into effect very particularly with metal, especially with steel or stainless steel as outer layer material. In a preferred embodiment, the composite element is a plate.

In the context of this invention, compact polyurethanes refer to polyurethane that has been produced without addition of blowing agents. It may be the case, however, that the polyols used comprise traces of residual water. The residual water content is preferably below 0.5% by weight, more preferably from 0% to 0.1% by weight, and more preferably from 0% to 0.03% by weight, based on the total weight of the reaction mixture. The density of compact polyurethane is preferably greater than 900 g/liter, more preferably greater than 950 g/liter and especially greater than 1000 g/liter.

Preferably, the polyether polyol (b1) is present in the mixture at 50% by weight to 95% by weight, further preferably at 55% by weight to 90% by weight and especially preferably at 60% by weight to 85% by weight. At the same time, the polyether polyol (b1) preferably has an average functionality of 1.7 to 2.9, further preferably 1.95 to 2.8, further preferably 2.2 to 2.7 and especially preferably 2.4 to 2.6.

In a further preferred embodiment, the polyether polyol (b1) simultaneously has a number-average molecular weight between $3.0 \times 10^3$ g/mol and $7.0 \times 10^3$ g/mol, preferably between $4.0 \times 10^3$ g/mol and $6.0 \times 10^3$ g/mol.

The polyether polyol (b2) is preferably present in the mixture at 5% by weight to 50% by weight. In a further-preferred embodiment, at the same time, the average functionality of the polyether polyol (b2) is 1.9 to 5.9, preferably 2.0 to 4.8, further preferably 2 to 4, even further preferably 2.5 to 3.5 and especially preferably 2.9 to 3.1.

In a preferred embodiment, in addition, the number-average molecular weight of the polyether polyol (b2) is between $0.15 \times 10^3$ g/mol and $4.0 \times 10^3$ g/mol, preferably between $0.15 \times 10^3$ g/mol and $2.0 \times 10^3$ g/mol, further preferably between $0.15 \times 10^3$ g/mol and $1.0 \times 10^3$ g/mol, and especially preferably between $0.15 \times 10^3$ g/mol and $0.6 \times 10^3$ g/mol.

The listed weight figures for the individual polyether polyols (b1) and (b2) are based on the total weight of the mixture of the polyether polyols (b1) and (b2) and, in a preferred embodiment, add up to 100% by weight. In another preferred embodiment, at least one further polyol may be present.

Preferably, the difference in the number-average molecular weight of the polyether polyols (b1) and (b2) is at least $0.5 \times 10^3$ g/mol, further preferably at least $1.0 \times 10^3$ g/mol, even further preferably at least $2.0 \times 10^3$ g/mol, and especially preferably at least $3.5 \times 10^3$ g/mol.

In a preferred embodiment, a chain extender is present in the composite element. Chain extenders used are substances having a molecular weight of preferably less than 150 g/mol, more preferably of 60 g/mol to 146 g/mol, where chain extenders have at least two hydrogen atoms reactive toward isocyanates. These may preferably be used individually or in the form of mixtures. Preferred examples are aliphatic, cycloaliphatic and/or araliphatic diols having 2 to 8 carbon atoms, preferably ethylene glycol, propane-1,3-diol, 1,2-dihydroxycyclohexane, 1,3-dihydroxycyclohexane, 1,4-dihydroxycyclohexane, diethylene glycol, dipropylene glycol and butane-1,4-diol, hexane-1,6-diol. Another preferred embodiment is a mixture of diols having 2 to 8 carbon atoms, preferably having 4 to 6 carbon atoms. The chain extender more preferably comprises dipropylene glycol and butanediol.

If chain extenders, crosslinking agents or mixtures thereof are employed for preparation of the polyisocyanate polyaddition products, these are preferably used in an amount of 0% by weight to 30% by weight, preferably of 2% by weight to 20% by weight, based on the weight of the compounds (b) reactive toward isocyanates used overall.

Useful isocyanate-comprising compounds include the aliphatic, cycloaliphatic, araliphatic and/or aromatic isocyanates that are known per se, preferably diisocyanates. It is also possible to use di- and/or polyisocyanates comprising ester, urea, allophanate, carbodiimide, uretdione and/or urethane groups.

In a preferred embodiment, the compound having isocyanate groups comprises the isocyanate diphenylmethane 2,4'-, 2,2'- and/or 4,4'-diisocyanate (MDI) and/or polyphenylpolymethylene polyisocyanate (PMDI), more preferably polyphenylpolymethylene polyisocyanate (PMDI).

The polyurethane formulation in the composite element described has a hardness measured to DIN 53505 at room temperature of more than 45 Shore D, preferably of more than 55 Shore D, more preferably of more than 60 Shore D, and simultaneously a hardness at 100° C. of more than 35 Shore D, preferably more than 40 Shore D and most preferably of more than 45 Shore D.

In a further-preferred embodiment, the polyurethane composition has a modulus of elasticity to DIN 53504 of more than 275 MPa in the range from −45° to +50° C. The adhesion between the polyurethane composition and the metal parts is preferably greater than 1, further preferably greater than 2 and more preferably greater than 4 MPa.

The elongation at break to DIN 53504 within the temperature range between −45 to +50° C. of the polyurethane composition is preferably greater than 10%, further preferably greater than 20% and especially preferably greater than 30%.

The tensile strength to DIN 53504 of the polyurethane composition is preferably greater than 10 MPa, further preferably greater than 15 MPa and more preferably greater than 20 MPa.

The compressive strength of the polyurethane composition is preferably greater than 8 MPa, further preferably greater than 15 mPa and more preferably greater than 20 MPa.

Further preferably, the polyurethane composition has at least two of the above-detailed mechanical properties, further preferably 3, further preferably 4, even further preferably 5 and, in a particular embodiment, all 6 of the properties mentioned within the preferred ranges described in each case.

In addition to the polyether polyalcohols of the invention, it is also possible to use aliphatic, araliphatic, cycloaliphatic and/or aromatic carboxylic acids to optimize the progression of hardness in the production of the polyurethane composition. Preferred carboxylic acids of this kind are formic acid, acetic acid, succinic acid, oxalic acid, malonic acid, glutaric acid, adipic acid, citric acid, benzoic acid, salicylic acid, phenylacetic acid, phthalic acid, ricinoleic acid, toluenesulfonic acid, derivatives of the acids mentioned, isomers of the acids mentioned and any desired mixtures of the acids mentioned. The proportion by weight of these acids is preferably 0% by weight to 5% by weight, preferably 0.2% by weight to 2% by weight, based on the total weight of the components for preparation of the polyurethane composition.

Catalysts (c) used may be commonly known compounds that accelerate the reaction of isocyanates with the compounds reactive toward isocyanates, preference being given to using a total catalyst content of 0.001% by weight to 15% by weight, especially of 0.05% by weight to 6% by weight, based on the weight of the compounds reactive toward isocyanates used overall. Preference is given to using the following compounds: triethylamine, tributylamine, dimethylbenzylamine, dicyclohexylmethylamine, dimethylcyclohexylamine, N,N,N',N'-tetramethyldiaminodiethyl ether, bis(dimethylaminopropyl)urea, N-methyl- or N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamine compounds, such as triethanolamine, triisopropanolamine, N-methyl- and N-ethyl-diethanolamine, dimethylaminoethanol, 2-(N,N-dimethylaminoethoxy)ethanol, N,N',N"-tris-(dialkylaminoalkyl)hexahydrotriazines, e.g. N,N',N"-tris(dimethylaminopropyl)-s-hexahydrotriazine, iron(II) chloride, zinc chloride, lead octoate and preferably tin salts such as tin dioctoate, tin diethylhexoate, dibutyltin dilaurate and/or dibutyldilauryltin mercaptide, 2,3-dimethyl-3,4,5,6-tetrahydropyrimidine, tetraalkylammonium hydroxides such as tetramethylammonium hydroxide, alkali metal hydroxides such as sodium hydroxide, alkali metal alkoxides such as sodium methoxide and potassium isopropoxide, and/or alkali metal salts of long chain fatty acids having 10 to 20 carbon atoms and optionally lateral OH groups.

It is advantageous to execute the preparation of the polyurethane composition in the presence of catalysts (c) since it accelerates and improves curing and adhesion.

It is optionally possible to add further fillers, auxiliaries and/or additives to the mixture of the components for the preparation of the polyurethane formulation based on the polyisocyanate polyaddition products. Examples of these include fillers, surface-active substances, dyes, pigments, flame retardants, hydrolysis stabilizers, fungistatic and bacteriostatic substances.

Useful surface-active substances include, for example, compounds that serve to assist the homogenization of the starting materials and may also be suitable for regulating the cell structure of the polyurethane formulation. Preferred examples are emulsifiers, such as the sodium salts of castor oil sulfates or of fatty acids, and salts of fatty acids with amines, e.g. diethylammonium oleate, diethanolammonium stearate, diethanolammonium ricinoleate, salts of sulfonic acids, e.g. alkali metal or ammonium salts of dodecylbenzene- or dinaphthylmethanedisulfonic acid and ricinoleic acid. The surface-active substances are preferably employed in amounts of 0.01% by weight to 5% by weight, based on 100% by weight of the compounds (b) reactive toward isocyanates used overall.

Examples of preferred flame retardants are, for example, tricresyl phosphate, tris(2-chloroethyl) phosphate, tris(2- chloropropyl) phosphate, tris(1,3-dichloropropyl) phosphate, tris(2,3- dibromopropyl) phosphate, tetrakis(2-chloroethyl)ethylene diphosphate, dimethylmethane phosphonate, diethyl diethanolaminomethylphosphonate and commercial halogen-containing flame-retardant polyols. Apart from the halogen-substituted phosphates already mentioned, it is also possible to use inorganic or organic flame retardants, such as red phosphorus, aluminum oxide hydrate, antimony trioxide, arsenic oxide, ammonium polyphosphate and calcium sulfate, expandable graphite or cyanuric acid derivatives, for example melamine, or mixtures of at least two flame retardants, for example ammonium polyphosphates and melamine and optionally corn starch or ammonium polyphosphate, melamine and expandable graphite and/or optionally aromatic polyesters to render the polyisocyanate polyaddition products flame-retardant. In general, it has been found to be appropriate to use 5% by weight to 50% by weight, preferably 5% by weight to 25% by weight, of the flame retardants mentioned, based on the weight of the compounds reactive toward isocyanates used overall.

Fillers, especially reinforcing fillers, are customary organic and inorganic fillers, reinforcing agents, weighting agents, agents for improving abrasion characteristics, coating agents etc. Preferred examples of fillers are inorganic fillers such as silica minerals, for example sheet silicates such as antigorite, serpentine, hornblendes, amphiboles, chrysotile and talc, metal oxides such as kaolin, aluminas, titanias and iron oxides, metal salts such as chalk, barytes and inorganic pigments such as cadmium sulfide and zinc sulfide, and also glass inter alia. Preference is given to using kaolin (china clay), aluminum silicate and coprecipitates of barium sulfate and aluminum silicate, and also natural and synthetic fibrous minerals such as wollastonite, short metal and glass fibers. Preferred organic fillers are, for example, charcoal, melamine, rosin, cyclopentadienyl resins and graft polymers, and also cellulose fibers, polyamide-polyacrylonitrile fibers, polyurethane fibers, polyester fibers based on aromatic and/or aliphatic dicarboxylic esters, and especially carbon fibers. The inorganic and organic fillers may be used individually or as mixtures.

In the preparation of the polyurethane composition, preference is given to using 10% by weight to 70% by weight of fillers, based on the weight of the overall polyurethane composition. Fillers used are preferably talc, kaolin, calcium carbonate, barytes, glass fibers and/or glass microbeads. The size of the particles of the fillers is preferably chosen such that the introduction of the components for preparation of the polyurethane composition into the space between the preferably pretreated metal surfaces is not hindered.

More preferably, the fillers have a particle size of less than 0.5 mm.

The fillers are preferably mixed in the polyol component.

The fillers preferably serve to reduce the coefficient of thermal expansion of the polyisocyanate polyaddition products which is greater compared to steel, for example, and hence to match the coefficient of expansion of the polyurethane composition to that of the steel. This is particularly advantageous for a sustainably firm bond, i.e. bonding between the polyurethane composition and the metal surfaces, since lower stresses thus occur between the layers under thermal stress.

The weight of the polyurethane compositions is equated to the total weight of all components used for preparation of the polyurethane composition.

For preparation of the polyurethane composition, the isocyanates and the compounds reactive toward isocyanates are reacted in such amounts that the equivalents ratio of NCO groups of the isocyanates to the sum total of reactive hydrogen atoms of the compounds reactive toward isocyanates is 0.85 to 1.25:1, preferably 0.95 to 1.15:1 and especially 1 to 1.05:1. If (ii) at least partly comprises bonded isocyanurate groups, a ratio of NCO groups to the sum total of reactive hydrogen atoms of 1.5 to 60:1, preferably 1.5 to 8:1, is typically employed.

The polyisocyanate polyaddition products are typically prepared by the one-shot process or by the prepolymer process, for example with the aid of the high-pressure or low-pressure technique.

It has been found to be particularly advantageous to work by the two-component process and to combine and preferably intimately mix the compounds (b) reactive toward isocyanates, optionally the catalysts (c) and/or auxiliaries and/or additives and fillers (d) in component (A), and to use isocyanates as component (B).

The starting components are typically mixed at a temperature of 0° C. to 100° C., preferably of 20° C. to 60° C., and introduced as already described into the space between the preferably pretreated metal surfaces. The mixing can be conducted mechanically by means of a stirrer or a stirrer screw or countercurrent mixing operation in the case of high-pressure processing. The reaction temperature, i.e. the temperature at which the conversion is effected, is typically above 20° C., preferably 50° C. to 150° C. This is preferably achieved in that the metal surfaces are heated before and/or during the introduction of the material. Suitable methods of heating the metal surfaces are known to those skilled in the art. Examples include flame treatment or inductive methods.

The invention further provides a process for producing the composite elements mentioned, wherein (a) the compound comprising at least two isocyanate groups is mixed with (b) polyether polyol, where the polyether polyol (b) is a mixture comprising at least the constituents of polyether polyol (b1) and polyether polyol (b2), optionally in the presence of (c) catalyst and/or (d) auxiliaries and/or additives and/or (e) chain extenders and the mixture is allowed to cure in contact with the metal layers. The result is thus the permanent bond between metal surfaces and polyurethane which is important to the composite.

Any mixture comprising components (a), (b), optionally (c), (d) and (e) used for the production of the polyurethane composition is also referred to as reaction mixture.

The water content in the reaction mixture comprising components (a), (b) and optionally (c), (d) and/or (e) is preferably between 0% by weight and 0.03% by weight, based on the weight of the reaction mixture. The water content, especially in the polyether component (b), can be adjusted by distillation, for example, such that the above-mentioned value in the reaction mixture is attained. The water leads to gas formation and hence bubble formation, which should be avoided in preferred embodiments.

Therefore, in another preferred embodiment, a substance that binds water and hence prevents a blowing reaction is added to the reaction mixture. Examples of preferred substances of this kind are molecular sieves. Preferred molecular sieves are silicates and oxazolidines, which are preferably used in finely divided form. These substances are preferably added in amounts of 0.05% by weight to 5% by weight, based on the weight of the reaction mixture, preferably based on component (b).

In a preferred embodiment, the compound (a) comprising isocyanate groups has an NCO content of 20% to 50%, preferably of 20% to 40% and further preferably of 20% to 35% and especially preferably of 20% to 32%.

In another preferred embodiment of the processes described, the mixture of the polyether polyols (b1) and (b2) optionally comprising (c) catalyst, (d) auxiliaries and/or additives and/or chain extenders (e) has a viscosity of less than $6.0 \times 10^3$ mPas, preferably less than $5.0 \times 10^3$ mPas and more preferably of less than $4.0 \times 10^3$ mPas, measured to DIN 53019 at 23° C.

In a preferred embodiment of the process, the compound (a) comprising isocyanate groups is the addition product of diisocyanate and one or more polyols having a molecular weight of $0.076 \times 10^3$ g/mol to $2 \times 10^3$ g/mol that are preferably polyether polyols. In another preferred embodiment, the compound comprising isocyanate groups is polyphenylpolymethylene polyisocyanate (PMDI). A preferred polyphenylpolymethylene polyisocyanate has a viscosity between 60 mPas to 2500 mPas, preferably between 80 mPas and 750 mPas and most preferably a viscosity between 100 mPas and 350 mPas, measured at 23° C. to DIN 53019.

In order to establish a good bond, it is advantageous to pretreat the surface of the metal prior to the contact with the polyurethane formulation. The pretreatment is preferably conducted directly prior to the introduction of the components of the polyurethane composition. Preferably, the surfaces of the metal surfaces that are in contact with the polyurethane formulation and adhere to the polyurethane formulation after the production of the composite elements are blasted with sand. This sandblasting is effected by customary methods, preferably at high pressure.

As well as the cleaning of the surface, it is roughened by the sandblasting. Each of these leads to better adhesion of the polyurethane formulation on the metal surface. The sandblasting is preferably effected immediately prior to introduction of the components for preparation of the polyurethane. In addition, it is also possible to apply adhesion promoters to these surfaces, which further improves the bond between polyurethane composition and the metal.

The preferably pretreated metal surfaces of the composite element are fixed in a suitable arrangement, preferably parallel to one another. The distance is chosen such that the space between the metal surfaces has a thickness of 10 mm to 100 mm. The metal parts are preferably fixed with spacers. The clear edges of the intermediate space between the metal are preferably sealed such that the space between the preferably pretreated metal surfaces can be filled with the reaction products of the polyurethane composition, and these components are prevented from flowing out. The sealing is preferably effected with polymer films or metal foils and/or plastic or metal plates which, in a preferred embodiment, can simultaneously serve as spacers. A particularly suitable method of filling is as described in EP 1 755 886.

Depending on the geometry, the space between the preferably treated metal surfaces is filled such that air bubbles that would worsen the bond between metal and polyurethane composition and form nuclei for corrosion are prevented.

The filling of the space between the preferably pretreated metal surfaces can be conducted with customary conveying devices, for example high- or low-pressure machinery, preferably high-pressure machinery. The components of the polyurethane composition are preferably fed in continuously.

The conveying output can be varied depending on the volume to be filled. In order to assure homogeneous through-curing of the polyurethane composition, the conveying output and conveying unit for the polyurethane composition are chosen such that the space to be filled between the metal surfaces is filled within 5 min to 20 min.

In another preferred process, an adhesion promoter is applied to the metal surface, preferably after the sandblasting. The adhesion promoter is preferably selected from the group of: polyurethane, polyurea, polyisocyanurate, epoxide or silane. Particular preference is given to adhesion promoters based on polyurethane since these form a particularly good bond to the metal surface.

This invention further provides a composite element obtainable by one of the abovementioned processes.

The invention still further provides for the use of the composite elements described herein in vehicles, ships, especially in deck constructions and ships' hulls, in aircraft or in built structures, preferably in bridges or buildings. In a preferred embodiment, the composite element is used as a floor, especially in high-rise buildings. In another preferred embodiment, the composite element provides protection from articles flying at high speed.

The invention further provides vehicles, ships, aircraft or built structures, especially bridges and high-rise buildings, and therein especially floors of preferably high-rise buildings, comprising a composite element described herein.

The composite elements of the invention should not be confused with conventional sandwich elements which comprise a rigid polyurethane and/or polyisocyanurate foam as core and are typically used for thermal insulation. Known sandwich elements of this kind would not be suitable for the fields of application mentioned on account of their comparatively lower mechanical durability.

EXAMPLES

Feedstocks

Poly 1: polyetherol prepared by alkoxylation of propylene glycol with propylene oxide and ethylene oxide having a functionality of 1.76 and a molecular weight of 3350 g/mol and an OH number of 29.5 mg KOH/g Poly 2: polyetherol prepared by alkoxylation of sucrose, glycerol with propylene oxide and ethylene oxide having a functionality of 4.15 and a molecular weight of 5250 g/mol and an OH number of 44 mg KOH/g Poly 3: polyetherol prepared by alkoxylation of ethylenediamine with propylene oxide having a functionality of 4 and a molecular weight of 300 g/mol and an OH number of 750 mg KOH/g Poly 4: polyetherol prepared by alkoxylation of glycerol with propylene oxide and ethylene oxide having a functionality of 2.49 and a molecular weight of 5170 g/mol and an OH number of 27 mg KOH/g Poly 5: polyetherol prepared by alkoxylation of toluenediamine with propylene oxide having a functionality of 3.9 and a molecular weight of 550 g/mol and an OH number of 398 mg KOH/g Poly 6: polyetherol prepared by alkoxylation of trimethylolpropane with propylene oxide having a functionality of 3.0 and a molecular weight of 200 g/mol and an OH number of 860 mg KOH/g KV 1: dipropylene glycol KV 2: butane-1,4-diol Zeo: zeolite paste, 50% in castor oil DF: AF 9000 defoamer/antifoam ISO1: Lupranat MP 102 from BASF Polyurethanes GmbH (prepolymer based on 4,4'MDI prepolymer with polyether polyol having an NCO content of 23% and a viscosity of 650 mPas at 25° C.)

ISO2: Lupranat M20S from BASF Polyurethanes GmbH (polymer MDI having an NCO content of 31.5% and a viscosity of 210 mPas at 25° C.)

ISO3: Lupranat MP 105 from BASF Polyurethanes GmbH (prepolymer based on 4,4'-MDI, PMDI and polyether polyol having an NCO content of 28.5% and a viscosity of 120 mPas at 25° C.) ISO4: ISO 136/26 from BASF Polyurethanes GmbH (prepolymer based on 4,4'MDI and polyether polyol having an NCO content of 18% and a viscosity of 1200 mPas at 25° C.)

ISO5: ISO 137/28 from BASF Polyurethanes GmbH (prepolymer based on 4,4'MDI and polyether polyol having an NCO content of 18% and a viscosity of 750 mPas at 25° C.)

ISO6: ISO 136/94 (prepolymer based on 4,4"MDI and polyetherol) from BASF Polyurethanes GmbH having an NCO content of 5.8% and a viscosity of 5500 mPas at 50° C.

ISO7: mixture of 48.5% ISO4 and 51.5% ISO5

For preparation of the polyol mixture, the constituents of the polyol component (polyols, additives etc.) were first mixed. Subsequently, the polyol component was reacted with the isocyanate specified in the mixing ratio specified in the table. The mixing ratio was chosen such that the equivalents ratio of NCO groups in the isocyanates to the sum total of the reactive hydrogen atoms in the compounds reactive toward isocyanates is 1.09:1. In order to determine the hardness or storage modulus, test specimens having a thickness of 1 cm or test sheets having a thickness of 2 mm were produced. The production was effected as follows:

The temperature of the polyol mixture and of the isocyanate component was room temperature (25° C.). The only exception was isocyanate component ISO 136/94. This was processed at a temperature of 50° C. In order to produce the test specimens, an appropriate amount of polyol component was initially charged and the appropriate amount of isocyanate component was added. The reactive mixture was then mixed at 800 rpm for 5 sec. and then at 1800 rpm for 55 sec. by means of a Speedmixer™ from Hauschild. The homogeneously mixed reaction mixture was then introduced into molds preheated correspondingly to 100° C. After 1 h at 100° C., the test specimens were demolded.

The hardness of the material was determined on the 1 cm-thick sheets. For this purpose, the sheets were first conditioned at room temperature for 7 days. The hardness was measured analogously to DIN 53505. In order to determine the hardness at 50° C. and 100° C., the materials were stored at the appropriate temperature in a corresponding oven for 3 h. The hardness was then measured directly in the oven at the appropriate temperature in order to avoid cooling of the material.

The examples which follow in table 1 are intended to illustrate the effect of the composition of the invention.

TABLE 1

|  | V1 | V2 | V3 | V4 | B1 |
|---|---|---|---|---|---|
| Poly 1 | 90 | 98 |  |  |  |
| Poly 2 | 10 |  |  |  |  |
| Poly 3 |  | 2 | 52.35 |  |  |
| Poly 4 |  |  | 45.00 | 57.50 | 57.50 |
| Poly 5 |  |  |  | 40.00 | 40.00 |
| Zeo |  |  | 2.50 | 2.35 | 2.35 |
| DF |  |  | 0.15 | 0.15 | 0.15 |
| Iso 2 | X | X |  |  | X |
| Iso 6 |  |  | X | X |  |
| Mixing ratio 100 polyol:X iso | 8.8 | 12.1 | 578 | 255 | 46.9 |
| Viscosity of polyol mixture [mPas] | 920 | 944 | 5500 | 3400 | 3400 |
| Hardness at RT | 13 A | 27 A | 72 A | 62 A | 68 D |
| Hardness at 50° C. |  |  | 72 A | 61 A | 64 D |
| Hardness at 100° C. |  |  | 72 A | 65 A | 55 D |

TABLE 1-continued

|  | V1 | V2 | V3 | V4 | B1 |
|---|---|---|---|---|---|
| Storage modulus [G'] from DMA at −40° C. | n.d. | n.d. | n.d. | n.d. | 570 |
| Modulus of elasticity calculated from DMA at −40° C. | n.d. | n.d. | n.d. | n.d. | 1600 |
| Storage modulus [G'] from DMA at +50° C. | n.d. | n.d. | n.d. | n.d. | 237 |
| Modulus of elasticity calculated from DMA at +50° C. | n.d. | n.d. | n.d. | n.d. | 660 | n.d. = not determined since the shore hardness of the material at room temperature (RT) is too low As apparent from comparative examples V1 to V4, As apparent from Example B1, a polyurethane having the desired properties and a modulus of elasticity of >275 MPa in the range from −45° to +50° C. is obtained. The polyurethanes obtained in V1 to V4 have low hardness and hence a low modulus of elasticity well below 275 MPa at 50° C. The specific combination of an isocyanate (a) having an NCO content of >20% by weight with an appropriate polyol mixture (b) gives an appropriate polyurethane. This is illustrated in examples B2 to B4 in relation to comparative examples V5 and V6.

|  | B2 | B3 | B4 | V5 | V6 |
|---|---|---|---|---|---|
| Poly 4 | 63.41 | 63.41 | 63.41 | 63.41 | 63.41 |
| Poly 6 | 15.31 | 15.31 | 15.31 | 15.31 | 15.31 |
| KV 1 | 12.90 | 12.90 | 12.90 | 12.90 | 12.90 |
| KV 2 | 5.45 | 5.45 | 5.45 | 5.45 | 5.45 |
| Zeo | 2.89 | 2.89 | 2.89 | 2.89 | 2.89 |
| DF | 0.04 | 0.04 | 0.04 | 0.04 | 0.04 |
| Iso 1 |  |  |  | X |  |
| Iso 2 | X |  |  |  |  |
| Iso 3 |  | X |  |  |  |
| Iso 6 |  |  |  |  | X |
| Iso 7 |  |  | X |  |  |
| Mixing ratio 100 polyol:X iso | 85.6 | 94.1 | 116 | 150 | 462 |
| Viscosity of polyol mixture [mPas] | 1500 | 1500 | 1500 | 1500 | 1500 |
| Hardness at RT | 69 D | 69 D | 73 D | 45 D | 60 A |
| Hardness at 50° C. | 66 D | 65 D | 68 D | 27 D | 57 A |
| Hardness at 100° C. | 55 D | 48 D | 52 D | 15 D | 55 A |
| Storage modulus [G'] from DMA at −40° C. [MPa] | 726 | 904 | 1219 | 990 | 85 |
| Modulus of elasticity calculated from DMA at −40° C. [MPa] | 2030 | 2530 | 3400 | 2770 | 238 |
| Storage modulus [G'] from DMA at +50° C. [MPa] | 302 | 213 | 237 | 7.2 | 2.5 |
| Modulus of elasticity calculated from DMA at +50° C. [MPa] | 840 | 600 | 660 | 20 | 7 |

The invention claimed is:

1. A composite element having the following layer structure:
    (i) 2 mm to 20 mm of metal,
    (ii) 10 mm to 100 mm of compact polyurethane formulation, said polyurethane formulation being obtainable by reacting
       (a) a compound having at least two isocyanate groups with
       (b) polyether polyol, optionally in the presence of
       (c) catalyst and/or
       (d) auxiliaries and/or additives,
       (e) chain extenders (iii) 2 mm to 20 mm of metal,
  wherein the compound (a) having at least two isocyanate groups has an NCO content of 20% to 50% and the polyether polyol (b) is a mixture comprising polyether polyol (b1) and polyether polyol (b2),
  wherein the polyether polyol (b1) has a number-average molecular weight between $3.0\times10^3$ g/mol and $7.0\times10^3$ g/mol and an average functionality of 2.2 to 2.7, the polyether polyol (b2) has a number-average molecular weight between $0.15\times10^3$ g/mol and $2.0\times10^3$ g/mol and an average functionality of 2.5 to 3.5, and wherein the polyether polyol (b1) is present in the mixture at 50% by weight to 95% by weight and the polyether polyol (b2) is present in the mixture at 5% by weight to 50% by weight.

2. The composite element according to claim 1, wherein the polyether polyol (b1) has an average functionality of 2.4 to 2.6.

3. The composite element according to claim 1, wherein the polyether polyol (b2) has an average functionality of 2.9 to 3.1.

4. The composite element according to claim 1, wherein weight percentages for the polyether polyols (b1) and (b2) are based on a total weight of the mixture consisting of the polyether polyol (b1) and (b2).

5. The composite element according to claim 1, wherein a difference in the number-average molecular weight of the polyether polyols (b1) and (b2) is at least $0.5\times10^3$ g/mol.

6. The composite element according to claim 5, wherein the difference in the number-average molecular weight of the polyether polyols (b1) and (b2) is at least $1.0\times10^3$ g/mol.

7. The composite element according to claim 5, wherein the difference in the number-average molecular weight of the polyether polyols (b1) and (b2) is at least $2.0\times10^3$ g/mol.

8. The composite element according to claim 1, wherein a chain extender is present.

9. The composite element according to claim 8, wherein the chain extender comprises a mixture of diols having 2 to 8 carbon atoms.

10. The composite element according to claim 1, wherein the compound a) having at least two isocyanate groups comprises the isocyanate diphenylmethane 2,4'-, 2,2'- and/or 4,4'-diisocyanate (MDI) and/or polyphenylpolymethylene polyisocyanate.

11. The composite element according to claim 1, wherein the polyurethane formulation has a hardness of more than 45 Shore D measured to DIN 53505.

12. A process for producing composite elements according to claim 1, which comprises mixing
  (a) the compound comprising at least two isocyanate groups with
  (b) polyether polyol, where the polyether polyol (b) is a mixture comprising at least the constituents of polyether polyol (b1) and polyether polyol (b2), optionally in the presence of
  (c) catalyst and/or
  (d) auxiliaries and/or additives and/or
  (e) chain extenders and allowing a mixture of (a)-(e) to cure in contact with the metal layers.

13. The process according to claim 12, wherein the compound a) having at least two isocyanate groups has an NCO content of 20% to 40%.

14. The process according to claim 12, wherein the mixture optionally comprising (c) catalyst, (d) auxiliaries and/or additives and/or chain extenders (e) has a viscosity of less than $6.0\times10^3$ mPas, measured to DIN 53019-1 at 23° C.

15. The process according to claim 14, wherein the compound (a) having at least two isocyanate groups is an addition product of diisocyanate and a polyol having a molecular weight of 0.076 to $2\times10^3$ g/mol.

16. A method of using composite elements, the method comprising:
  incorporating the composite elements according to claim 1 into vehicles, ships, aircraft or built structures.

17. A vehicle, ship, aircraft or built structure comprising composite elements according to claim 1.

18. The composite element according to claim 1, wherein the compound (a) having at least two isocyanate groups comprises the isocyanate diphenylmethane 2,4'-, 2,2'- and/or 4,4'-diisocyanate (MDI) and/or polyphenylpolymethylene polyisocyanate, the polyether polyol (b1) has a number-average molecular weight between $4.0\times10^3$ g/mol and $6.0\times10^3$ g/mol and an average functionality of 2.2 to 2.7, and the polyether polyol (b2) has a number-average molecular weight between $0.15\times10^3$ g/mol and $1.0\times10^3$ g/mol and an average functionality of 2.5 to 3.5.

19. The composite element according to claim 18, wherein the polyether polyol (b1) has an average functionality of 2.4 to 2.6, and the polyether polyol (b2) has an average functionality of 2.9 to 3.1.

* * * * *

UNITED STATES PATENT AND TRADEMARK OFFICE
CERTIFICATE OF CORRECTION

| | | |
|---|---|---|
| PATENT NO. | : 11,806,965 B2 | Page 1 of 1 |
| APPLICATION NO. | : 16/963934 | |
| DATED | : November 7, 2023 | |
| INVENTOR(S) | : Christof Grieser-Schmitz and Andre Kamm | |

It is certified that error appears in the above-identified patent and that said Letters Patent is hereby corrected as shown below:

On the Title Page

In item (30), in Foreign Application Priority Data, delete "Jan. 31, 2018 (EP) ........... 8154345" and insert therefor -- Jan. 31, 2018 (EP) .......... 18154345.5 --.

Signed and Sealed this
Eighteenth Day of June, 2024

Katherine Kelly Vidal
*Director of the United States Patent and Trademark Office*